United States Patent [19]
Harbert et al.

[11] Patent Number: 5,306,471
[45] Date of Patent: Apr. 26, 1994

[54] CONCENTRIC OZONATOR TUBE ASSESMBLY

[76] Inventors: Matthew G. Harbert, 3650 Armitage St., San Diego, Calif. 92117; Daniel M. Rohrbach, 2416 Deerpark Dr., San Diego, Calif. 92110

[21] Appl. No.: 747,353
[22] Filed: Aug. 20, 1991
[51] Int. Cl.⁵ .............................................. B01J 19/12
[52] U.S. Cl. ........................... 422/186.19; 422/186.18
[58] Field of Search ..................... 422/186.18, 186.19

[56] References Cited

U.S. PATENT DOCUMENTS

| | | | |
|---|---|---|---|
| 1,437,760 | 12/1922 | Kuhlenschmidt | 422/186.18 |
| 1,454,219 | 5/1923 | Goedicke | 422/186.18 |
| 1,498,393 | 6/1924 | McEachron | 422/186.18 |
| 1,531,196 | 3/1925 | Kuhlenschmidt | 422/186.18 |
| 1,834,705 | 12/1931 | Hartman | 422/186.19 |
| 3,530,058 | 9/1970 | Blanchard | 204/320 |
| 4,213,838 | 7/1980 | Lowther | 204/176 |
| 4,214,995 | 7/1980 | Saylor | 250/539 |
| 4,410,495 | 10/1983 | Bassler | 422/186.18 |
| 4,417,966 | 11/1983 | Krauss | 204/176 |
| 4,603,031 | 7/1986 | Gelbman | 422/186.18 |
| 4,614,573 | 9/1986 | Masuda | 204/176 |
| 4,774,062 | 9/1988 | Heinemann | 422/186.19 |
| 4,834,948 | 5/1989 | Shmiga et al. | 422/186.19 |
| 4,960,569 | 10/1990 | Fovell | 422/186.19 |
| 4,981,656 | 1/1991 | Leitzke | 422/186.18 |
| 5,008,087 | 4/1991 | Batchelor | 422/186.22 |

Primary Examiner—Peter A. Nelson
Assistant Examiner—Daniel Jenkins
Attorney, Agent, or Firm—Baker, Maxham, Jester & Meador

[57] ABSTRACT

A durable, efficient and inexpensive corona discharge ozonator tube assembly of the Siemens Ozonizator. A very high conversion efficiency of 4.0 kWhr/kgO$_3$ is attained, demonstrating a thermal efficiency of approximately 20%. The assembly consists of industry-standard sized stainless-steel and glass elements held in position by means of a novel nonconductive endcap design. The resulting output ozone concentration of 2.5% at a one liter per minute air flow rate provides approximately 77 grams per day of ozone for the preferred embodiment having a single five-inch long corona chamber.

14 Claims, 2 Drawing Sheets

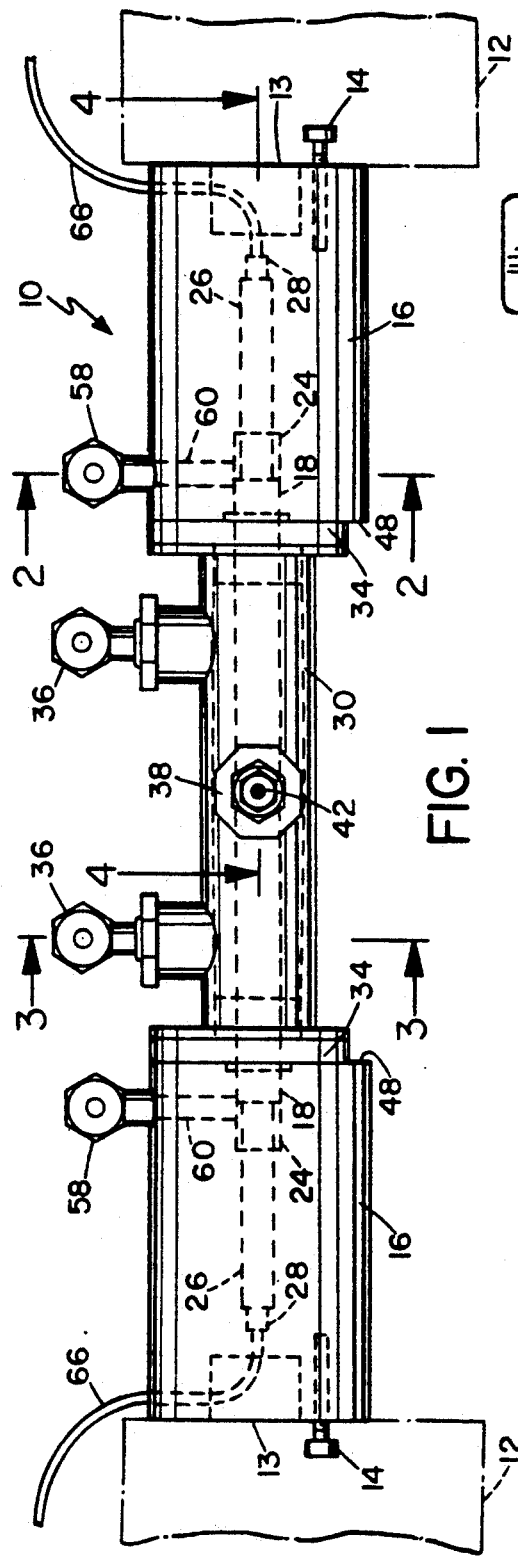
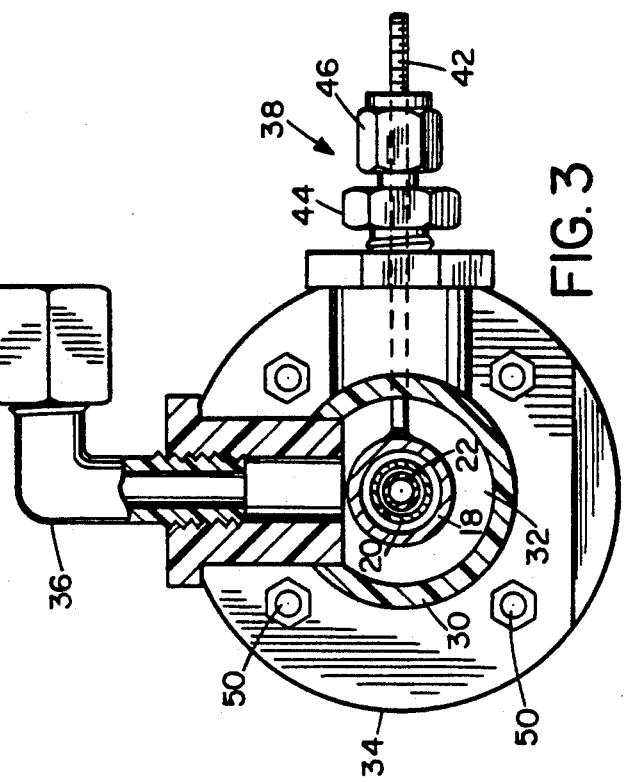
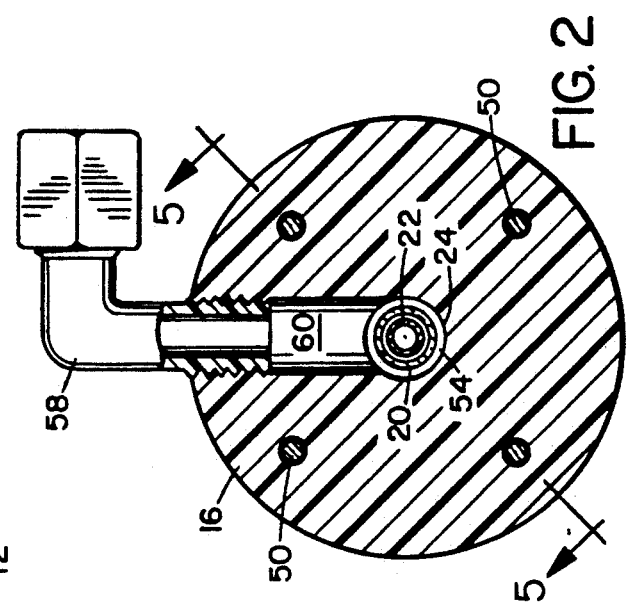

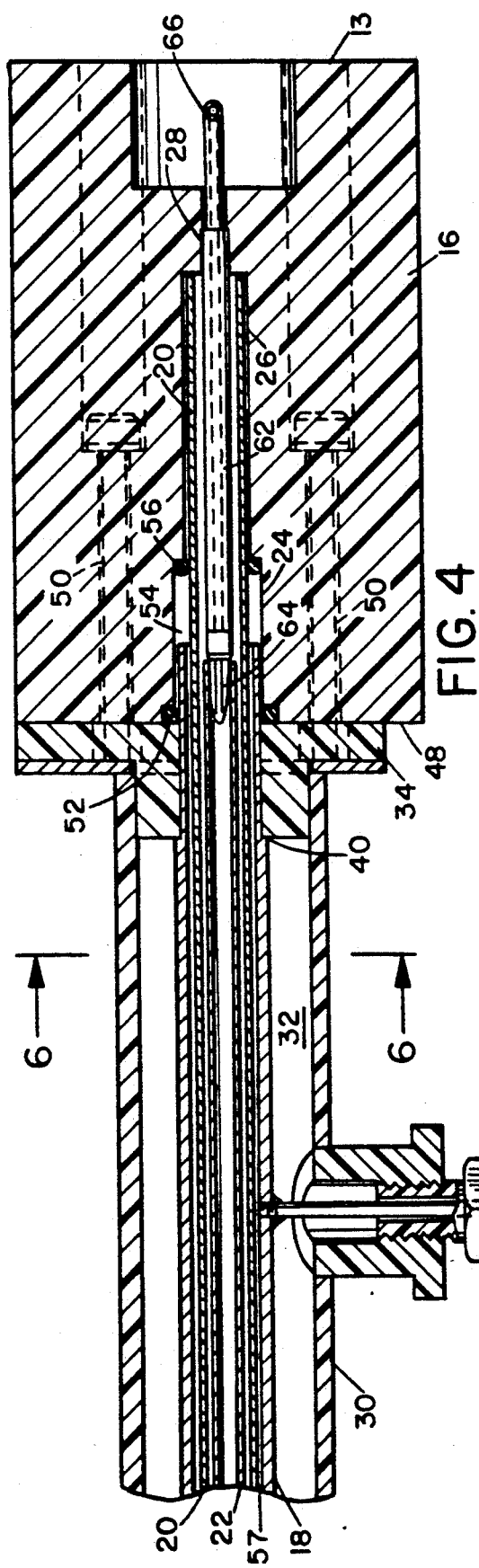
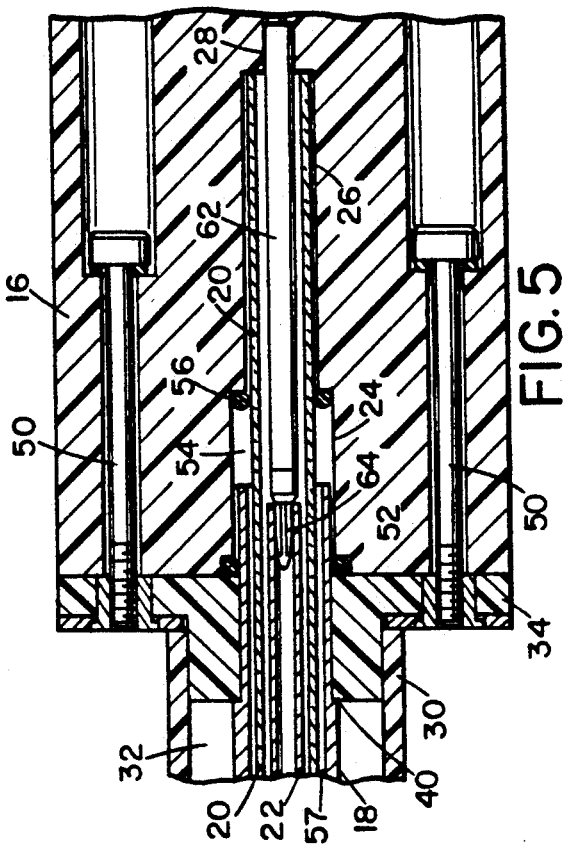
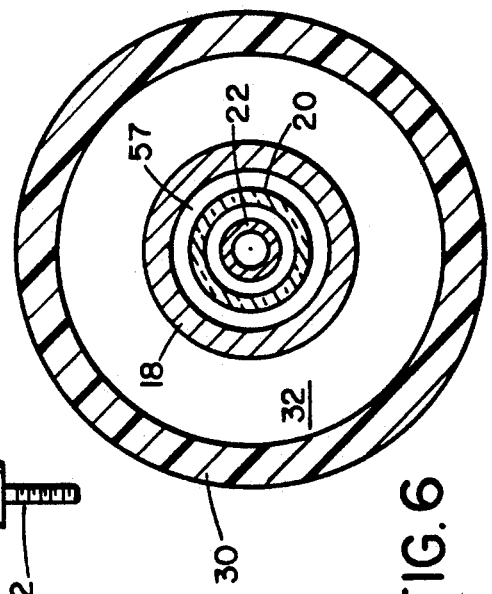

CONCENTRIC OZONATOR TUBE ASSESMBLY

BACKGROUND OF THE INVENTION

Field of the Invention

Our invention relates generally to an apparatus for the chemical recombination of gases or aerosols by corona discharge and, more particularly, to an apparatus for ozone enrichment of air or oxygen.

Description of the Related Art

Ozone is generally formed by the reaction of oxygen atoms and oxygen molecules. The splitting of an oxygen molecule can be achieved through application of electrical, optical, chemical or thermal energy. Our invention relates in particular to the splitting of oxygen molecules by means of electrical energy arising from application of a voltage between two concentric electrodes having an amplitude that varies with time. Apparatus of this type is known in the art as the "Siemens Ozonizator", consisting in principle of two elongated concentric electrode surfaces separated by a dielectric to form a corona discharge ozonization chamber between the surfaces. Cooling water is normally disposed on at least one side of the ozonization chamber.

In the generation of ozone for commercial purposes, cost is the primary factor governing design. Ozone generation costs include initial capital investment, amortization rates and operation costs. For small-scale ozonators, initial investment is the major concern because operating and maintenance costs are relatively minimal. However, both initial and operating costs are of concern to the user.

Small-scale commercial ozonators may be used to disinfect swimming pools, kill bacteria in storage areas, hospitals, deodorize rooms or factories, or to sterilize closed systems. Laboratory ozonators, used to study chemical reactions, are usually more versatile units capable of producing ozone at higher concentrations.

Commercial ozonators known in the art are basically very simple. A current flow is established between two electrode surfaces separated by a dielectric material disposed to ensure uniformity of current density. Air or oxygen present in the gap between electrodes is excited to the proper energy level and ozone is formed by collisions between oxygen molecules and disassociated atomic oxygen. Practitioners believe that ozone conversion efficiency depends on many parameters involving the design of the ozonator. All such design parameters have an effect on each other, working together in an interlocking manner. The fundamental approach to improving the Siemens device involves inventive combinations of these design parameters.

The distance between the electrode surfaces must be large enough to ensure uniform current density and also must be large enough for practical fabrication without excessively tight machine tool tolerances. However, a gap too large can require an operating voltage too high to be economically practical. A gap too small may restrict the air flow to the point of excessive pressure drop through the ozonator.

The operating pressure is chosen to provide sufficient force to deliver the ozonized gas to the destination but gas pressure affects the interelectrode electrical impedance and must be correlated with the air gap and the preferred operating voltage.

The decomposition rate of ozone increases rapidly with temperature. Because most (until now, 90% or more) of the energy applied to the ozonator is lost as heat, means are needed for rapid excess heat removal. Costs and benefits of refrigeration or high-speed cooling fluid flow must be balanced.

The dielectric material ideally would have high electrical resistance and high thermal conductivity, but such properties rarely occur together. Thus, the dielectric is usually chosen for its high electrical resistance and kept to a minimal thickness to minimize the effects of a low thermal conductivity.

Both voltage and current must be considered in selecting an ozonator operating voltage. While it is known that higher frequencies increase ozonator efficiency, the electrical costs of creating high frequencies often will offset the economic gain from the enhanced efficiency.

The time that feed gas is present in the corona discharge region determines the concentration of ozone in the effluent. This concentration varies in the art from 0 5% to 10% by weight under ideal conditions. However, ozone conversion efficiency drops rapidly as ozone concentration increases and a compromise is made to balance these two factors.

Large-scale ozone generating units (50 kg/day and up) require approximately $1,000 of capital investment per kilogam of daily ozone capacity. Small-scale ozonators (less than 1.0 kg/day) require several times this amount of capital investment per kilogram of daily capacity. However, this disparity is not commercially fatal because the initial costs for typical small-scale ozonator operations are generally insignificant compared to the initial costs of the entire associated application.

Until now, economical ozonator conversion efficiencies were limited to 5% when producing ozone at 1% concentration from air. This thermal ozone conversion efficiency can be doubled by using pure oxygen as the feed gas. Thus, 15-30 kWhr are required to produce one kilogram of ozone, as has been long recognized in the art. Many practitioners have attempted to improve the thermal conversion efficiency of the Siemens Ozonizator.

In U.S. Pat. 4,790,980, Peter Erni, et al., disclose a device and process for the generation of ozone employing a compensation choke for tuning the ozonator capacitive load to a special power supply using square-wave current of variable amplitude and frequency. Erni, et al., report that their invention operates with an energy efficiency of 14-15 kWhr/kg from air and 6 kWhr/kg from pure oxygen when incorporated in a large-scale 60 kW ozone generator unit.

In U.S. Pat. No. 4,960,569, Richard C. Fovell, et al., disclose a corona discharge ozonator comprising special cooling means for improved cooling efficiency. Fovell et al., report that their invention permits operation with energy efficiencies of 15 kWhr/kg. Other practitioners have proposed improvements to the Siemens Ozonizator calculated to improve thermal conversion efficiency but most fail to specifically report the actual improvement in efficiency resulting from their inventions. For instance, in U.S. Pat. No. 3,530,058, Paul Blanchard discloses an ozonator element having a deflecting ring arrangement at each end of an inner-coated glass tube, designed to permit ozonator operation at higher voltages than otherwise possible. Blanchard offers no specific efficiency improvement data.

In U.S. Pat. No. 4,410,495, Peter Bassler, et al., disclose an ozonator designed to permit airflow between the inner electrode and the dielectric tube with an outer electrode comprising metal-coated regions that can be switched in and out of the electrical circuit as necessary for optimum current density control. They do not report actual improvements in thermal conversion efficiency, however.

In U.S. Pat. No. 4,417,966, Ralff Krauss, et al., disclose a typical Siemens Ozonizator comprising plasma chambers in lieu of metallic electrodes. Their plasma chambers each comprise a high voltage electrode sealed in a low pressure plasma disoharge chamber that serves as a plasma electrode, allegedly resulting in a significant increase in conversion efficiency and reduced waste heat.

In U.S. Pat. No. 4,603,031, Howard A. Gelbman, discloses a Siemens Ozonizator having perforations in the inner electrode together with a central and radial sealing arrangement that forces the air stream to flow within and between the inner electrode and the dielectric walls in a manner that supposedly improves thermal conversion efficiency by way of improved air flow and ozone density output. In U.S. Pat. No. 4,614,573, Senichi Masuda discloses an ozonator apparatus that operates on pressure with pressurized gas to purportedly increase ozone generation efficiency.

In U.S. Pat. No. 4,774,062, Klaus Heinemann, discloses a corona discharge ozonator having several spaced electrodes with at least every other electrode having a porcelain coating containing less than 3% titanium dioxide. In U.S. Pat. No. 4,981,656, Ortwin Leitzke, discloses an ozonator tube device having a solid inner electrode with polygonal cross-section of five or more edges. Leitzke teaches that the ratio of the diameter of the external electrode to the largest internal electrical diameter must be less than two. None of these practitioners offer details of actual efficiency improvements over prior art.

There is a continuing and strongly-felt need in the art for novel improvements to the Siemens Ozonizator design permitting operation on any scale at enhanced thermal conversion efficiencies. Lower operating costs will arise from improved efficiency. These improvements must also avoid high initial capital costs. Although many practitioners have attempted to improve the efficiency of the Siemens Ozonizator through a wide variety of inventive techniques, nothing heretofore in the art has overcome the limitation of such ozonators to 5% thermal conversion efficiency with air and 10% conversion efficiency with pure oxygen. Thus, there is a strongly felt need in the art for techniques that improve thermal conversion efficiency without increases in cost or complexity. These unresolved problems and deficiencies are clearly felt in the art and are solved by our invention in the manner described below.

SUMMARY OF THE INvENTION

We have experimented with the Siemens Ozonizator and developed several incremental improvements that, taken together, have resulted in a 100% increase in thermal conversion efficiency and a net reduction in initial capital acquisition costs. Our invention comprises the particular novel combination of incremental improvements to the Siemens Ozonizator that we disclose herein.

The primary feature of our invention is the novel nonconductive endcap design that we use to hold the ozonator electrodes in precise alignment. We use two endcaps of identical design. Each endcap comprises three concentric bore holes disposed for precise electrode spacing. A large bore hole holds an elongate outer hollow electrode in position. An intermediate bore hole holds a shock-mounted elongate hollow dielectric element in position within the outer electrode and an inner bore hole holds an elongate inner electrode in position within the dielectric element. The dielectric element can be very thin-walled because of the 0-ring shock-mounting arrangement of our invention.

Another important feature of our invention is our inner electrode standoff insulator design whereby we position the inner electrode between the two endcaps within the inner bore holes of each while limiting the inner electrode length to that necessary for optimum corona discharge uniformity. We also connect the inner electrode to high voltage, contrary to normal practice. This technique is possible only because of our insulating endcap design.

Because we use the inner electrode for high voltage, we are able to ground the outer electrode. This is another important feature of our invention and permits us to flow cooling fluid around and along the large outer electrode surface without the need for electrical insulation to isolate the cooling fluid from the electrode. To prevent cooling fluid leakage, we invented an integral cooling jacket assembly having a permanently sealed cooling fluid flow space disposed between two flanges that are each adapted for attachment to our endcap design.

It is yet another feature of our invention that we flow air or oxygen through the outer gap between the outer electrode and the dielectric instead of the inner gap between dielectric and inner electrode. This avoids a requirement for cooling the inner electrode gap. Because of the intimate cooling contact between our cooling water and the larger outer electrode, we create highly efficient heat removal that reduces the undesirable ozone recombination that would otherwise occur at higher temperatures.

Yet another important feature of our invention is our use of O-rings to mount and seal the thin dielectric tube at each end in our nonconductive endcap design. Our use of an O-ring protects the fragile thin-walled dielectric tube from shock and vibration transmitted through the endcap mounting surfaces and also seals the air and ozone flow space at the endcap/dielectric junction. The thin dielectric wall dimension of our invention also improves heat flow from the interior electrode space to the cooled outer electrode surface.

The primary advantage of our invention is the high thermal conversion efficiency actually measured in the laboratory with prototype embodiments. Yet another primary advantage of our invention is the reduced capital costs made possible by our exclusive use of industry standard component dimensions with our novel nonconductive endcap design.

Yet another advantage of our invention is the simplicity of repair and ease of replacement of damaged parts made possible by our use of standard components. Our invention allows disassembly, replacement of any of the ozonator components, and reassembly without degradation of reliability and efficiency.

It is an advantage of our invention that the initial cost of our ozonator is low and it is a further advantage of our invention that the operating costs of our ozonator are low because of the enhanced thermal efficiency made possible by precise component positioning.

Our invention may also be used to break down air pollutants and for any other purposes achieved by exposing a flowing gas to a corona discharge field. For instance, recombination of certain types of air pollution chemicals can be accelerated by exposing the polluted air to a corona discharge field as is known in the art. However, the primary purpose of our invention is to provide an ozonator tube assembly that is inexpensive and capable of high thermal conversion efficiencies.

The foregoing, together with other features and advantages of our invention, will become apparent when referring to the following specifications, claims and the accompanying drawings.

BRIEF DESCRIPTION OF THE DRAWINGS

For a more complete understanding of our invention, we now refer to the following detailed description of the embodiment illustrated in the accompanying drawings, wherein:

FIG. 1 shows a side elevation view of the preferred embodiment of our ozonator tube assembly;

FIG. 2 shows an enlarged sectional view taken on line 2—2 of FIG. 1;

FIG. 3 shows an enlarged sectional view taken on line 3—3 of FIG. 1;

FIG. 4 shows an enlarged sectional view taken on line 4—4 of FIG. 1;

FIG. 5 shows a sectional view taken on line 5—5 of FIG. 2; and

FIG. 6 shows an enlarged sectional view taken on line 6—6 of FIG. 4.

DESCRIPTION OF THE PREFERRED EMBODIMENT

FIG. 1 shows a side view of the preferred embodiment of our invention. The ozonator tube assembly 10 is shown mounted between two supporting surfaces 12 at the endcap outside faces 13 by fastening means 14. Assembly 10 comprises two nonconducting endcaps 16, which serve to support and align the elongate hollow outer electrode 18, the elongate hollow dielectric 20 and the elongate inner electrode 22. Each endcap 16 comprises an inside face 48 having three concentric bore holes including a large bore hole 24, an intermediate bore hole 26 and a small bore hole 28. Electrodes 18 and 22 should consist of stainless steel tubing.

Referring to FIG. 4, note that outer electrode 18 is disposed within an elongate jacket 30 and a fluid-tight fluid flow space 32 is formed between the flanges 34 at each end shown in FIG. 1. In our invention, a sealed cooling jacket assembly is fabricated as a single unit comprising jacket 30, outer electrode 18, and two flanges 34 together with the two cooling fluid connector means 36 and the ground terminal assembly 38 illustrated in FIG. 3. The joints between jacket 30, outer electrode 18 and flange 34 are sealed during manufacture using glue, epoxy or other suitable means used in the art. Outer electrode 18 is held rigidly in position by flange 34 at a ridge 40 machined into each end of electrode The resulting cooling jacket assembly is replaceable as a single unit. We prefer a suitable plastic for jacket 30.

FIG. 3 also shows the detail of connector means 36 and ground terminal assembly 38. Assembly 38 comprises a low voltage connector means having a conductive feed-through contact 42 that is welded to electrode 18 in any suitable manner known in the art. Assembly 38 also includes feed-through sealing means 44 for sealing off the cooling fluid flow space 32 to prevent leakage at contact 42. Finally, assembly 38 comprises a conductive threaded terminal lug 46 suitable for clamping a grounding cable (not shown) to ground terminal assembly 38.

Cooling fluid connection means 36 merely comprises several standard self-sealing threaded components adapted for connecting to a pressurized source of cooling fluid without leakage or fluid pressure loss and should consist of a suitable plastic material.

Referring again to FIG. 4, note that flange 34 is held tightly fixed against inside face 48 of endcap 16 by means of endcap fastening means comprising the threaded bolts 50. A first O-ring seal 52 is disposed to seal the junction between outer electrode 18 and endcap 16 against leakage at the inside end of the gas-tight ozone space 54. Gas-tight ozone space 54 includes the open portions of large bore hole 24, which acts to hold outer electrode 18 securely in radial position with respect to endcap 16, and adjoins the gas-tight ozone flow space 57 formed between outer electrode 18 and dielectric 20.

Dielectric 20 is disposed within outer electrode 18 and held securely in radial position with respect to endcap 16 because each end of dielectric 20 is disposed within intermediate bore hole 26. The second O-ring seal 56 serves two purposes. First, O-ring 56 seals the outside end of gas-tight ozone space 54 at the juncture between endcap 16 and dielectric 20. Secondly, O-ring 56 serves to insulate dielectric 20 from any shock and vibration transmitted through endcap 16, thereby avoiding unwanted breakage of a fragile, thin-wall glass tube used for dielectric 20. It is not necessary for dielectric 20 to extend completely to the end of intermediate bore hole 26 as shown in FIG. 4, although dielectric 20 should extend substantially beyond the ends of inner electrode 22 and outer electrode 18 to ensure corona field uniformity at the electrode ends in space 54.

The gas-tight ozone space 54 formed in large bore hole 24 between endcap 16 and dielectric 20 is directly connected with ozone flow space 57 formed between dielectric 20 and outer electrode 18. Ozone space 54 is connected directly to the ozone connector means 58 through a hollow channel 60 as shown in FIGS. 1 and 2. Ozone connector means 58 comprises the appropriate combination of any suitable self-sealing gas-tight connector elements known in the art and may be mechanically identical to cooling fluid connector means 36. The direction of flow between connectors 58 is unimportant and the direction of flow between connectors 36 is also unimportant. However, we prefer that the gas flow direction between connectors 58 be opposite to the fluid flow direction between connectors 36 such that the cooler fluid enters cooling jacket 30 at the end of assembly 10 where the ozone gas flow is exiting. This locates the coolest fluid temperatures at the end having the highest ozone concentration, thereby minimizing ozone recombination rates throughout assembly 10.

Inner electrode 22 is positioned within dielectric 20 and held securely at each end by a nonconductive standoff 62. Each nonconductive standoff is disposed within small bore hole 28 and held securely in radial relationship to each endcap 16. Nonconductive standoff 62 is our novel means for precise radial positioning of inner conductor 22 with respect to dielectric 20 and outer conductor 18 without extending inner conductor 22 beyond the end of outer conductor 18. The relative lengths of conductors 18 and 22 shown in FIGS. 4 and 5 are necessary for a uniform corona field at the ends of electrode 18. Nonconductive standoff 62 is hollow and comprises a high voltage connector means 64 together with an insulated copper wire 66 leading from connector means 64 out to a high-voltage power supply (not shown). Wire 66 must be insulated to withstand up to 15,000 volts. We select the length and diameter of standoff 62 to precisely position inner electrode 22 to prevent arc-over and to ensure corona field uniformity.

We have found that endcap 16 can be manufactured from acrylic plastic, but simple acrylic plastic may be too conductive for long-term reliability because of a tendency for deterioration of the endcap material within space 54 because of the corona field emanated from dielectric 20 within ozone space 54. Accordingly, an alternative embodiment may include a concentric ceramic insert (not shown) disposed adjacent to the endcap walls of space 54 to retard deterioration arising from corona discharge within space 54. Other embodiments could use of glass, ceramic, or perhaps Teflon ® materials for endcaps 16. Outer electrode 18 has a length of 7.0 inches and an inner diameter of 0.35 inches. Dielectric 20 is 11.25 inches long and comprises standard Corning Glass tubing (type 1720 or 1724). Endcap 16 has an outer diameter of 2.5 inches and a length from inner face 48 to outer face 13 of 4.0 inches. Our ozonator tube assembly invention can be operated at 15,000 VAC up to 3,000 Hz to make ozone. The optimum ozonator pressure is 21 psi, but our tube assembly can be operated up to 100 psi for other purposes requiring corona discharge for chemical recombination. At a one liter per minute airflow rate, our assembly will produce an ozone concentration of 2.5 percent at 12,000 volts, 60 Hz.

Because we have selected standard component sizes our ozonator tube assembly 10 can be mass-produced inexpensively and can be disassembled for repair and maintenance purposes without difficulty. Our invention permits the use of industry standard component sizes by virtue of our novel method for holding electrode and dielectric elements in radial alignment using several concentric bore holes in inner face 48 of endcap 16. The precise spacing and novel cooling resulting from our invention results in a very high thermal conversion efficiency, requiring only 4 kWhr per kilogram of ozone. Our preferred embodiment produces 77 grams of ozone per day at a one liter per minute airflow rate.

Obviously, other embodiments and modifications of our invention will occur readily to those of ordinary skill in the art in view of these teachings. Therefore, our invention is to be limited only by the following claims, which include all such obvious embodiments and modifications when viewed in conjunction with the above specification and accompanying drawings.

We claim:

1. A corona discharge ozonator tube assembly comprising:
    two endcaps, each said endcap having an inside face, said face having at least three concentric endcap bore holes comprising a small, an intermediate and a large bore hole;
    a cooling jacket assembly having two jacket ends and an elongate hollow outer electrode,
        an elongate jacket disposed to surround said outer electrode, and
        two flanges, one said flange disposed at each said jacket end to sealably join said jacket to said outer electrode, thereby forming a substantially fluid-tight cooling fluid flow space between said outer electrode and said elongate jacket;
    endcap fastening means for sealably joining said endcap inside face to said flange at each said jacket end such that both said large bore holes join with the hollow interior of said outer electrode to form a substantially gas-tight ozone space;
    an elongate hollow dielectric having two dielectric ends, said dielectric disposed within said outer electrode and held in concentric relationship with said outer electrode by the disposition of said dielectric ends within said intermediate endcap bore holes; and
    an elongate inner electrode having two ends, said inner electrode disposed within said dielectric and held in concentric relationship with said dielectric by the disposition of said inner electrode ends within said small bore holes.

2. The assembly described in claim 1 further comprising:
    sealing means for sealing the junction between said intermediate bore hole and said dielectric to form a substantially gas-tight ozone flow space between said dielectric and said outer electrode.

3. The assembly described in claim 2 wherein each said endcap further comprises:
    ozone connector means for inserting and removing gas from said gas-tight ozone space.

4. The assembly described in claim 3 wherein said cooling jacket assembly further comprises:
    cooling fluid connector means for inserting and removing cooling fluid from said cooling fluid flow space.

5. The assembly described in claim 4 wherein said cooling jacket assembly further comprises:
    low voltage connector means for inserting electrical current into said outer electrode.

6. The assembly described in claim 5 wherein said inner electrode further comprises:
    high voltage connector means for inserting electrical current into said inner electrode.

7. The assembly described in claim 6 wherein each said endcap further comprises:
    an outside face comprising fastening means for mounting said assembly to a surface.

8. The assembly described in claim 7 wherein said inner electrode comprises:
    at least one non-conductive standoff disposed at each said inner electrode end.

9. The assembly described in claim 2 wherein each said endcap further comprises:
    ozone connector means for inserting and removing gas from said gas-tight ozone flow space.

10. The assembly described in claim 1 wherein said cooling jacket assembly further comprises:
    cooling fluid connector means for inserting and removing cooling fluid from said cooling fluid flow space.

11. The assembly described in claim 1 wherein said cooling jacket assembly further comprises:
    low voltage connector means for inserting electrical current into said outer electrode.

12. The assembly described in claim 1 wherein said inner electrode further comprises:

high voltage connector means for inserting electrical current into said inner electrode.

13. The assembly described in claim 1 wherein said inner electrode comprises:

at least one non-conductive standoff disposed at each said inner electrode end.

14. The assembly described in claim 1 wherein each said endcap further comprises:
an outside face comprising generator fastening means for mounting said assembly to a surface.

* * * * *